(12) United States Patent
Takaai et al.

(10) Patent No.: US 9,779,263 B2
(45) Date of Patent: Oct. 3, 2017

(54) ACCESS RIGHT ESTIMATION APPARATUS AND NON-TRANSITORY COMPUTER READABLE MEDIUM

(71) Applicant: FUJI XEROX CO., LTD., Tokyo (JP)

(72) Inventors: Motoyuki Takaai, Yokohama (JP); Hiroyuki Sayuda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/793,068

(22) Filed: Jul. 7, 2015

(65) Prior Publication Data

US 2016/0267283 A1    Sep. 15, 2016

(30) Foreign Application Priority Data

Mar. 10, 2015    (JP) .................................. 2015-047122

(51) Int. Cl.
  *G06F 21/62* (2013.01)
  *G06N 99/00* (2010.01)
  (Continued)

(52) U.S. Cl.
  CPC ........ *G06F 21/6218* (2013.01); *G06F 21/604* (2013.01); *G06N 99/005* (2013.01)

(58) Field of Classification Search
  CPC ......... G06F 17/30707; G06F 17/30011; G06F 21/604; G06F 21/6218; G06N 99/005
  See application file for complete search history.

(56) References Cited

U.S. PATENT DOCUMENTS 7,496,561 B2    2/2009 Caudill et al.
2003/0149854 A1*    8/2003 Yoshino .............. G06F 12/1458
                                                       711/173
(Continued)

FOREIGN PATENT DOCUMENTS

JP    H11-66086 A    3/1999
JP    2008015615 A    1/2008
(Continued)

OTHER PUBLICATIONS

Apr. 6, 2016 Office Action issued in Australian Patent Application No. 2015210456.
(Continued)

*Primary Examiner* — Yin-Chen Shaw
*Assistant Examiner* — Arya Golriz
(74) *Attorney, Agent, or Firm* — Oliff PLC (57) ABSTRACT

A access right estimation apparatus includes an extraction unit that extracts at least one first component from a first object which forms a first document, an access right being set up for the first document; an association unit that associates the extracted first component with access right information which indicates a user who is capable of accessing the first component based on the access right which is set up for the first document; and an access right estimation unit that estimates an access right that should be set up for a second document, which includes at least one second component extracted from a second object that forms the second document, an access right being not set up for the second document, the access right estimation unit estimating the access right based on the second component and the access right information which is associated with the first component.

9 Claims, 6 Drawing Sheets

(51) Int. Cl.
    *G06F 17/27*     (2006.01)
    *G06F 21/60*     (2013.01)

(56) References Cited

U.S. PATENT DOCUMENTS

| | | | |
|---|---|---|---|
| 2007/0073880 A1* | 3/2007 | Krishnakumar | H04L 63/102 709/225 |
| 2007/0260550 A1* | 11/2007 | Pieper | G06F 21/10 705/59 |
| 2009/0044283 A1 | 2/2009 | Yoshihama | |
| 2009/0051961 A1 | 2/2009 | Ohsawa | |
| 2010/0185676 A1* | 7/2010 | Weaver | G06Q 10/00 707/783 |
| 2012/0150537 A1 | 6/2012 | Abe et al. | |
| 2012/0192286 A1 | 7/2012 | Messing et al. | |
| 2014/0136323 A1* | 5/2014 | Zhang | G06F 17/30483 705/14.53 |
| 2014/0283109 A1* | 9/2014 | Quong | G06F 21/10 726/27 |
| 2014/0373163 A1 | 12/2014 | Abe et al. | |

FOREIGN PATENT DOCUMENTS

| | | |
|---|---|---|
| JP | 2011013982 A | 1/2011 |
| JP | 2012123163 A | 6/2012 |

OTHER PUBLICATIONS

Feb. 16, 2017 Office Action issued in Australian Application No. 2015210456.

\* cited by examiner

DOCUMENT 4
WITH REGARD TO THE DEVELOPMENT OF A
NEW PRODUCT WITH COMPANY A
PUT FORWARD WITH PREPARATION PRIOR TO
DISCLOSURE OF TECHNOLOGY B TO COMPANY A — 740

FIG. 8A

| SORTING WORD | WORD COMBINATION |
|---|---|
| COMPANY A, COOPERATION WORK | COMPANY A-COOPERATION WORK |
| COMPANY A, TECHNICAL PARTNERSHIP | COMPANY A-TECHNICAL PARTNERSHIP |
| COMPANY A, NEW PRODUCT, DEVELOP | COMPANY A-NEW PRODUCT, COMPANY A-DEVELOP, NEW PRODUCT-DEVELOP |

FIG. 8B

| SORTING WORD | WORD COMBINATION |
|---|---|
| COMPANY A, TECHNICAL PARTNERSHIP | COMPANY A-TECHNICAL PARTNERSHIP |
| COMPANY A, TECHNOLOGY B, DISCLOSE | COMPANY A-TECHNOLOGY B, COMPANY A-DISCLOSE, TECHNOLOGY B-DISCLOSE |

FIG. 8C

| SORTING WORD | WORD COMBINATION |
|---|---|
| COMPANY A, NEW PRODUCT, DEVELOP | COMPANY A-NEW PRODUCT, COMPANY A-DEVELOP, NEW PRODUCT-DEVELOP |
| COMPANY A, MARKET ANALYSIS, SHARE | COMPANY A-MARKET ANALYSIS, COMPANY A-SHARE, MARKET ANALYSIS-SHARE |

FIG. 8D

| SORTING WORD | WORD COMBINATION |
|---|---|
| COMPANY A, NEW PRODUCT, DEVELOP | COMPANY A-NEW PRODUCT, COMPANY A-DEVELOP, NEW PRODUCT-DEVELOP |
| COMPANY A, TECHNOLOGY B, DISCLOSE | COMPANY A-TECHNOLOGY B, COMPANY A-DISCLOSE, TECHNOLOGY B-DISCLOSE |

FIG. 9

| WORD COMBINATION | DOCUMENT 1 | DOCUMENT 2 | DOCUMENT 3 | DOCUMENT 4 |
|---|---|---|---|---|
| COMPANY A-COOPERATION WORK | ✓ | | | |
| COMPANY A-TECHNICAL PARTNERSHIP | ✓ | ✓ | | |
| COMPANY A-NEW PRODUCT | ✓ | | ✓ | ✓ |
| COMPANY A-DEVELOP | ✓ | | ✓ | ✓ |
| NEW PRODUCT-DEVELOP | ✓ | | ✓ | ✓ |
| COMPANY A-TECHNOLOGY B | | ✓ | | ✓ |
| COMPANY A-DISCLOSE | | ✓ | | ✓ |
| TECHNOLOGY B-DISCLOSE | | ✓ | | ✓ |
| COMPANY A-MARKET ANALYSIS | | | ✓ | |
| COMPANY A-SHARE | | | ✓ | |
| MARKET ANALYSIS-SHARE | | | ✓ | |

FIG. 10

| WORD COMBINATION | USER A | USER B | DOCUMENT 4 |
|---|---|---|---|
| COMPANY A-COOPERATION WORK | ○ | ○ | |
| COMPANY A-TECHNICAL PARTNERSHIP | ○ | ○ | |
| COMPANY A-NEW PRODUCT | ○ | ○ | ✓ |
| COMPANY A-DEVELOP | ○ | ○ | ✓ |
| NEW PRODUCT-DEVELOP | ○ | ○ | ✓ |
| COMPANY A-TECHNOLOGY B | ○ | | ✓ |
| COMPANY A-DISCLOSE | ○ | | ✓ |
| TECHNOLOGY B-DISCLOSE | ○ | | ✓ |
| COMPANY A-MARKET ANALYSIS | | ○ | |
| COMPANY A-SHARE | | ○ | |
| MARKET ANALYSIS-SHARE | | ○ | |

*FIG. 11*

ACCESS RIGHT ESTIMATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-047122 filed on Mar. 10, 2015.

BACKGROUND

Technical Field

The present invention relates to an access right estimation apparatus and a non-transitory computer readable medium.

SUMMARY

An aspect of the present invention provides an access right estimation apparatus comprising: an extraction unit that extracts at least one first component from a first object which forms a first document, an access right being set up for the first document; an association unit that associates the extracted first component with access right information which indicates a user who is capable of accessing the first component based on the access right which is set up for the first document; and an access right estimation unit that estimates an access right that should be set up for a second document, which includes at least one second component extracted from a second object that forms the second document, an access right being not set up for the second document, the access right estimation unit estimating the access right based on the second component and the access right information which is associated with the first component.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiment(s) realizing the present invention will be described with reference to the accompanying drawings.

Figure 1:
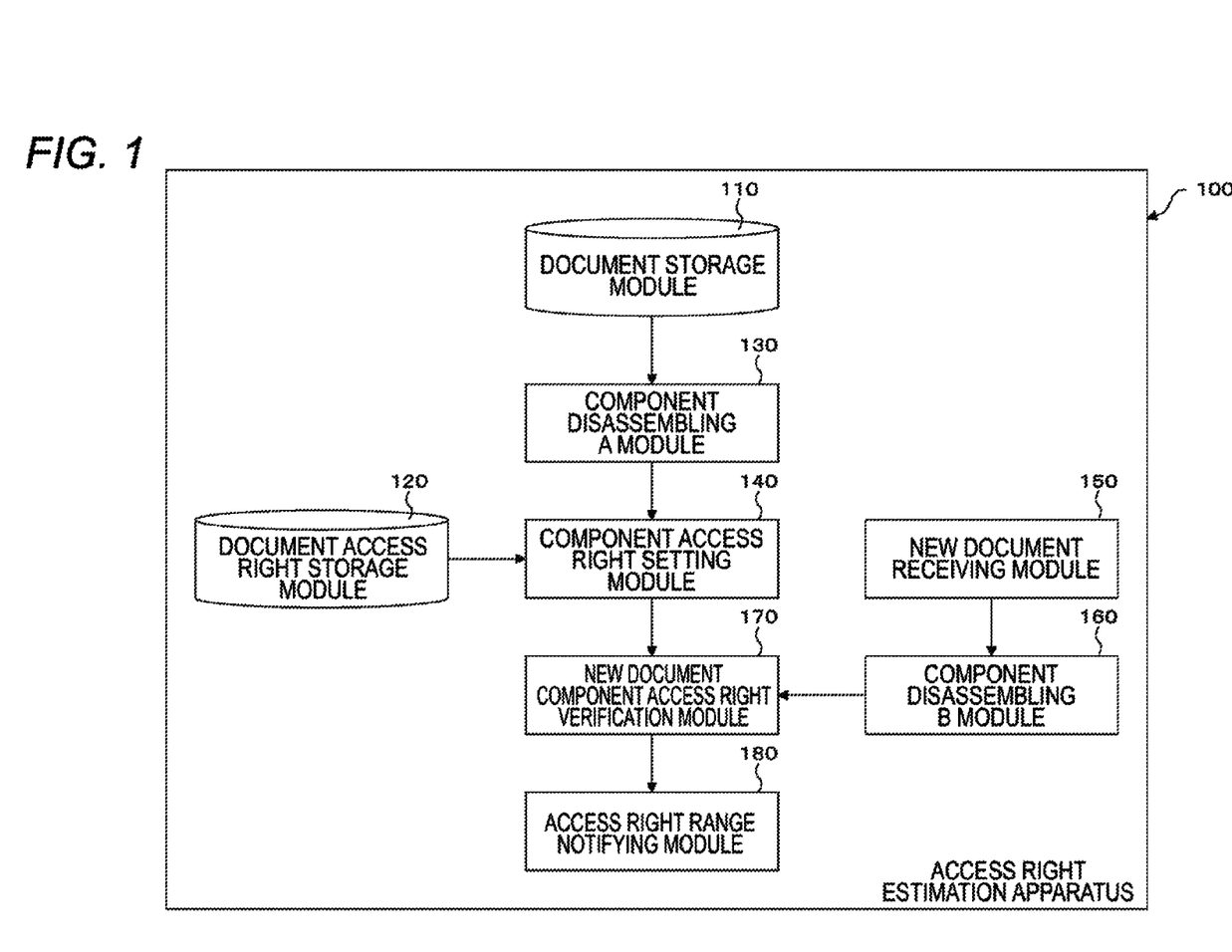
FIG. 1 is conceptual module configuration diagram illustrating an example of a configuration according to an embodiment.

FIG. 1 is a conceptual module configuration diagram illustrating an example of a configuration according to the embodiment.

Meanwhile, a module generally indicates a component, such as logically separable software (computer program) or hardware. Therefore, a module in the embodiment indicates a module in a hardware configuration in addition to a module in a computer program. Therefore, in the embodiment, a computer program (a program causing a computer to execute each procedure, a program causing a computer to function as each unit, and a program causing a computer to realize each function), a system, and a method which are caused to function as modules are described. However, although "store", "cause to store", and expressions equivalent thereto are used for convenience of explanation, theses expressions mean "cause a storage device to store", or "perform control to cause a storage device to store" when the embodiment is a computer program. In addition, a module may correspond to a function one-to-one. However, in the implementation, a single module may be formed by a single program, plural modules may be formed by a single program, and, on the contrary, a single module may be formed by plural programs. In addition, the plural module may be executed by a single computer, or a single module may be executed by plural computers using computers in a distributed or parallel environment. Meanwhile, a single module may include another module. In addition, hereinafter, "connection" is used for a case of logical connection (data transmission and reception, instruction, reference relationship between data, or the like) in addition to physical connection. "Determined in advance" means "determined before a process which is a subject is performed", and is used while also meaning determined according to a situation and a state at that time or according to a situation and a state until that time before a process according to the embodiment starts, and before a process which is a subject is performed even after the process according to the embodiment starts. When there are plural "values which are determined in advance", the values may be different from each other, or two or more values (it is apparent that all the values may be included) may be the same. In addition, description which has a meaning of "in a case of A, B is performed" is used to mean, "determine whether or not A occurs, and B is performed when it is determined that A occurs". However, a case in which it is not necessary to determine whether or not it is an A is excluded.

In addition, a system or an apparatus is formed in such a way that plural computers, hardware, apparatuses, or the like are connected through communication means, such as a network (including communication in one-to-one connection), and there is a case in which the system or the apparatus is realized using a single computer, hardware, an apparatus, or the like. The "apparatus" and the "system" are used as synonymous terms with each other. It is apparent that the "system" does not include only a "social mechanism" (social system) which is human determination.

In addition, information, which is a subject, is read from the storage device for each process, which is performed by each module, or for respective processes when the plural processes are performed in a module. After a process is performed, the result of the process is written into the storage device. Therefore, there is a case in which descriptions of reading from the storage device before a process is performed and description of writing into the storage device after a process is performed are omitted. Meanwhile, here, the storage device may include hard disk, a Random Access Memory (RAM), an external storage medium, a storage device through a communication line, a register in a Central Processing Unit (CPU), and the like.

An access right estimation apparatus 100 according to the embodiment estimates an access right to be recommended when an access right is given to a document, and includes a document storage module 110, a document access right storage module 120, a component disassembling A module 130, a component access right setting module 140, a new document receiving module 150, a component disassembling B module 160, a new document component access right verification module 170, and an access right range notifying module 180, as illustrated in FIG. 1.

Generally, in order for a user to enable a specific person to have access to a certain document, a person who has access to the document should check the content and set up an access right.

In the embodiment, based on a document, which is registered in advance and in which an access right is set up, the relationship between the content thereof and a user, to which the access right is permitted, is extracted. An access right range is acquired based on the content of a document to be newly registered using the relationship, and the user is notified of the access right range.

The document storage module 110 is connected to the component disassembling A module 130. The document storage module 110 stores an existing document group. Meanwhile, a document mainly includes text data, electronic data (also called a file), such as figures, images, video, and voice, depending on the situation, and the combinations thereof. The document is a subject to be stored, edited, or searched. The document is capable of being converted between systems or users as an individual unit, and includes similar things thereto. More specifically, the document includes a document, a Web page, or the like which is prepared by a document preparing program.

The document access right storage module 120 is connected to the component access right setting module 140. The document access right storage module 120 stores an access right for an existing document. A data structure, which indicates an access right for a document, includes, for example, an access control matrix, an access control list, capability, and the like. Meanwhile, the access control matrix is a list which is acquired by associating a user and a document and which enumerates operations, permitted to be performed for the document by the user, on entries determined by the user and the document. The access control list is a list of users who access the document and operations which are permitted for the users with the access control list being determined for each document. The capability is determined for a user and includes a pair of a document, which is accessed by the user, and an operation which is permitted for the document. Here, the user may include a group which includes plural users.

The component disassembling A module 130 is connected to the document storage module 110 and the component access right setting module 140. The component disassembling A module 130 performs disassembling into components. The component disassembling A module 130 extracts at least one first component from an object which forms a first document for which an access right is set up.

In addition, the component disassembling A module 130 may extract the component from the object through morphological analysis.

More specifically, the component disassembling A module 130 disassembles the object of the document into components. The object includes, for example, a sentence in the document, each page of the document, a drawing (which may include a table, a photograph, or the like) included in the document, and the like. In addition, the components are acquired by disassembling the object. For example, components, which are acquired through morphological analysis or the like, include, for example, a set of words of text in the document, and co-occurrence of plural (for example, two) words in each sentence of the text in the document. Meanwhile, there is a case in which a component is the object itself.

The component access right setting module 140 is connected to the document access right storage module 120, the component disassembling A module 130, and the new document component access right verification module 170. The component access right setting module 140 sets up an access right for a component. The component access right setting module 140 associates a first component, which is extracted by the component disassembling A module 130, with access right information, which indicates a user who is capable of accessing the first component, based on the access right which is set up for the first document.

More specifically, the component access right setting module 140 sets up a list of users who have access to each component based on an access right which is added in advance to the document to which the component belongs.

The new document receiving module 150 is connected to the component disassembling B module 160. The new document receiving module 150 receives a new document. Here, the new document is a document which is in a state in which an access right has not yet been set up and to which the access right should be given.

The component disassembling B module 160 is connected to the new document receiving module 150 and the new document component access right verification module 170. The component disassembling B module 160 performs disassembling into components. Although the component disassembling B module 160 has a different processing subject, the component disassembling B module 160 performs a process which is equivalent to the process performed by the above-described component disassembling A module 130.

The new document component access right verification module 170 is connected to the component access right setting module 140, the component disassembling B module 160, and the access right range notifying module 180. The new document component access right verification module 170 verifies an access right for the components of the new document. The new document component access right verification module 170 estimates an access right which should be set up for a second document based on at least one second component, which is extracted from an object that forms the second document for which an access right is not set up, and access right information which is associated with the first component.

More specifically, the new document component access right verification module 170 verifies settings, which are the results of processes performed by the component access right setting module 140, for the respective components of the new document, and acquires access rights thereof. Further, the new document component access right verification module 170 acquires an access right range to the whole document based on the access rights for the respective components of the new document.

In addition, the new document component access right verification module 170 may estimate importance levels of the respective second components extracted from the object that forms the second document. Further, the access right that should be set up for the second document may be estimated using a sum of the importance levels of the second components.

In addition, the new document component access right verification module 170 may estimate whether or not an access right of a target user should be set up for the second document by acquiring a ratio of a sum of the importance levels of second components to which the target user has the access rights to the sum of the importance levels of the second components.

In addition, the new document component access right verification module 170 may perform machine learning using the first components of the first document.

In addition, the new document component access right verification module 170 may further estimate the access right (a new access right) which should be set up for the first document.

In addition, when one of the second components which does not coincide with any one of the first components is included in the second component, the new document component access right verification module 170 (1) may exclude said one of the second components and estimates the access right based on other second components, or (2) may terminate the estimation processing.

In addition, the new document component access right verification module 170, when one of the second components which does not coincide with any one of the first components, may cause the access right range notifying module 180 to notify that a new access right should be set up for the second document.

The access right range notifying module 180 is connected to the new document component access right verification module 170. The access right range notifying module 180 notifies a user of the access right range of the new document which is received by the new document receiving module 150. The notification may be performed through display on a display apparatus, such as a liquid crystal display, may be performed through the output of voice using a speaker or the like, or may be performed through the combination thereof. Further, an access right may be set up for a document through an operation performed by a user using a mouse, a keyboard, a touch panel, a voice, one's eyes, a gesture, or the like. In addition, an access right may be set up for a document according to the result of the process performed by the new document component access right verification module 170 without providing a notification to the user.

In addition, when it is estimated that an access right of a specified user should not be set up for the a second document, the access right range notifying module 180 notifies the specified user of at least one second component to which the specified user does not have the access right In addition, when the new document component access right verification module 170 estimates the access right which should be set up for the first document and when it is estimated the access right of a specified user should be set up for the first document the first document, the access right range notifying module 180 may notifies the specified user of the access right of the specified user being currently not set up for the first document.

In addition, when the new document component access right verification module 170 estimates the access right which should be set up for the first document and when it is estimated that the access right of a specified user should not be set up for the first document, the access right range notifying module 180 may send a caution.

Figure 2:
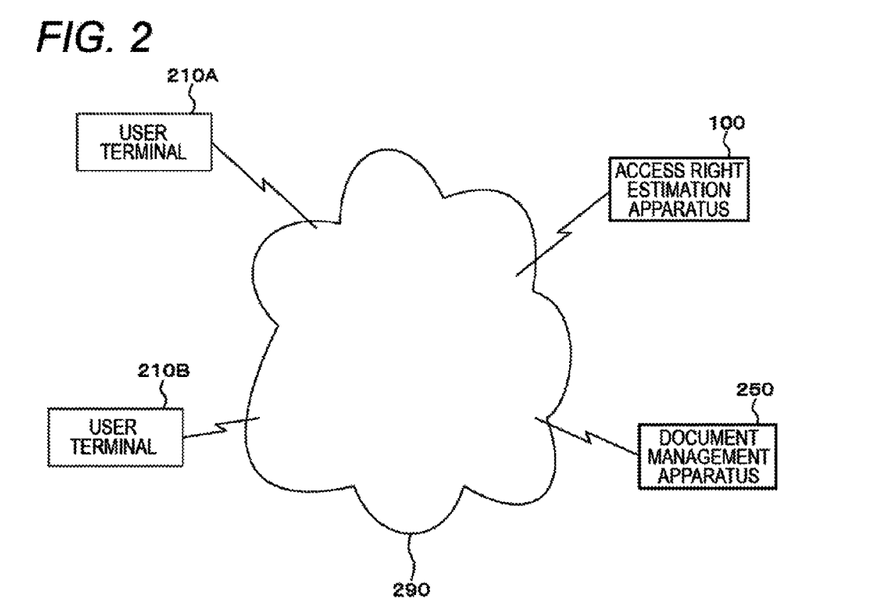
FIG. 2 is an explanatory diagram illustrating an example of the configuration of a system according to the embodiment.

FIG. 2 is an explanatory diagram illustrating an example of the configuration of a system according to the embodiment.

The access right estimation apparatus 100, a user terminal 210A, a user terminal 210B, and a document management apparatus 250 are connected to each other through a communication line 290. The communication line 290 may be a wireless line, a wired line, or the combination thereof. For example, the communication line 290 may be the Internet, Intranet, or the like as a communication infrastructure. The document management apparatus 250 may manage the document, and may include the document storage module 110 and the document access right storage module 120. The access right estimation apparatus 100 may perform processes using the document storage module 110 and the document access right storage module 120 in the document management apparatus 250. In addition, the access right estimation apparatus 100 may be included in the document management apparatus 250. In addition, functions, which are performed by the access right estimation apparatus 100 and the document management apparatus 250, may be realized as a cloud service.

The user terminal 210 prepares a document and sets up an access right through an operation performed by the user, and a personal computer corresponds thereto. Further, when an access right is set up for a document, a process of setting up an access right is performed by receiving a support provided by the access right estimation apparatus 100.

Figure 3:
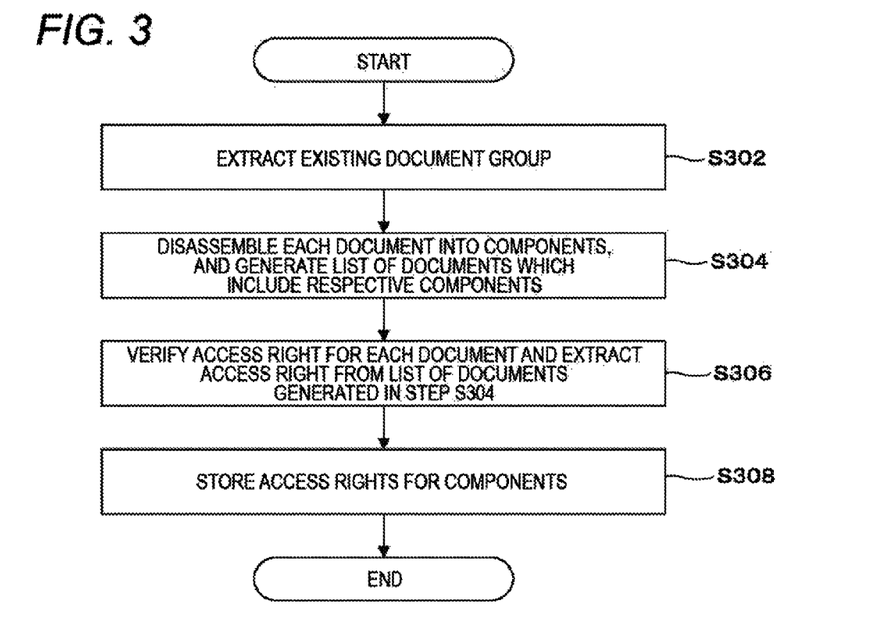
FIG. 3 is a flowchart illustrating an example of a process according to the embodiment.

FIG. 3 is a flowchart illustrating an example of a process according to the embodiment.

In step S302, the component disassembling A module 130 extracts an existing document group from the document storage module 110. A document to be extracted may be a whole document in the document storage module 110, or a document, which is relevant to a user who tries to give an access right to the document received by the new document receiving module 150, may be extracted. For example, the document may include a document to be extracted may be a document, which is prepared by a member of a group or an organization to which the user belongs, or a document in which an access right is given to the member. In addition, the document may include a document, which is prepared by a person who exchanges a message with the user using electronic mail or the like, or a document in which an access right is given to the person.

In step S304, the component disassembling A module 130 disassembles each document into components, and generates a list of documents which include the respective components.

The component disassembling A module 130 disassembles each sentence of the text of a document into words. Here, division into words is performed using a technology, such as morphological analysis.

Subsequently, a combination of arbitrary two words is generated in each sentence.

Further, a list of documents, in which the combinations of the two words are included, is generated.

In step S306, the component access right setting module 140 verifies the access right from the document access right storage module 120 for each document, and extracts access rights from the list of documents generated in step S304. Therefore, the combinations of two words are associated with the access rights.

In step S308, the component access right setting module 140 stores the access rights for the components. A table, in which the combinations of two words are associated with the access rights, is stored for a process of a flowchart in an example in FIG. 4.

Figure 4:
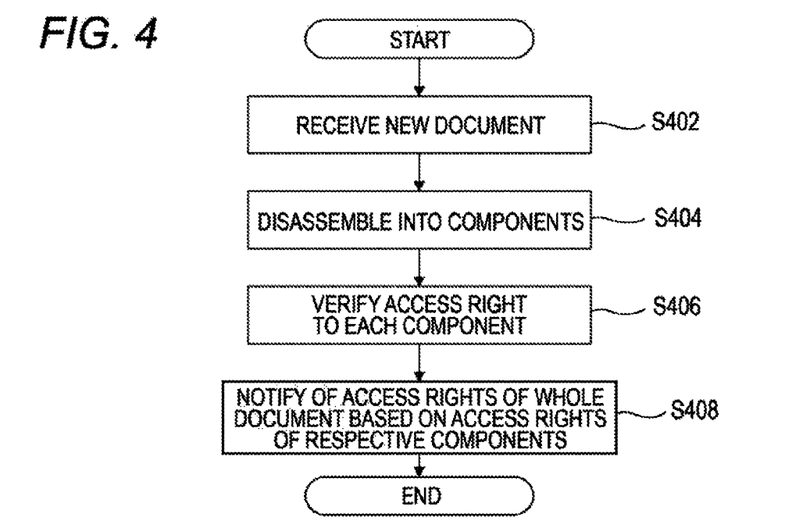
FIG. 4 is a flowchart illustrating an example of a process according to the embodiment.

The process of a flowchart in the example in FIG. 3 may be performed in advance for the process (batch processing) of the flowchart in the example in FIG. 4.

FIG. 4 is a flowchart illustrating the example of the process according to the embodiment.

In step S402, the new document receiving module 150 receives a new document. The document is a document of a subject to which an access right is given.

In step S404, the component disassembling B module 160 disassembles the document into components, and performs the same process as in step S304. That is, the component disassembling B module 160 disassembles each sentence into words using a technology such as morphological analysis, and generates combinations of two arbitrary words in each sentence.

In step S406, the new document component access right verification module 170 verifies the access rights to the respective components using the access rights corresponding to the components which are stored in step S308. That is, the candidates of an access right to the document, which is a subject, are extracted using an access right to a document including the same components as the components in the document (document which is received in step S402) which is the subject.

In step S408, the access right range notifying module 180 sends a notification of the access rights to the whole document based on the access rights of the respective components.

In the embodiment, in the document management apparatus 250 in which plural users share a document, an access right to a document, which is set up in the past, is associated with the content of the document, and an access right which should be given to a specified document (a document which is received by the new document receiving module 150) is estimated.

Here, in order to understand the content of the document, an object, which is the component (or a subset thereof may be included) of the document, is set to a subject. Here, as described above, the component of the document includes, for example, each page of the document, a drawing included in the document, words of text in the document, co-occurrence of two words in each sentence of the text in the document, or the like.

Hereinafter, the co-occurrence of two words in each sentence of the text will be described as an example of the component of the document.

Figure 5:
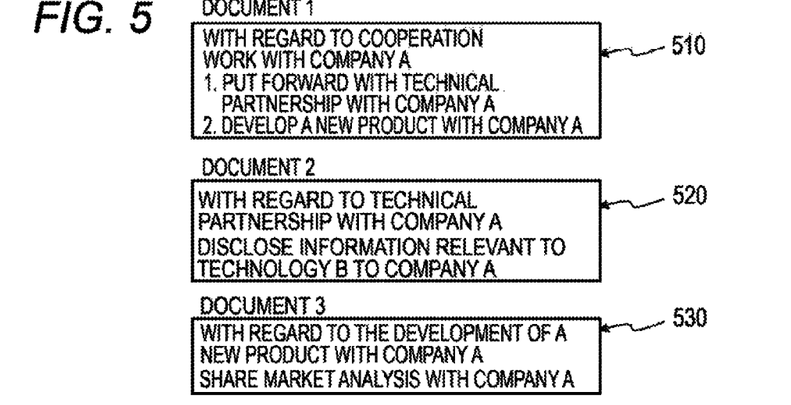
FIG. 5 is an explanatory diagram illustrating an example of a process according to the embodiment.

In step S302, the component disassembling A module 130 extracts a document 1, a document 2, and a document 3 as illustrated in an example in FIG. 5.

The document content 510 of the document 1 is as below.
With regard to cooperative work with company A
1. Put forward with technical partnership with company A
2. Develop a new product with company A
The document content 520 of the document 2 is as below.
With regard to technical partnership with company A
Disclose information relevant to technology B to company A
The document content 530 of the document 3 is as below.

Figure 6:
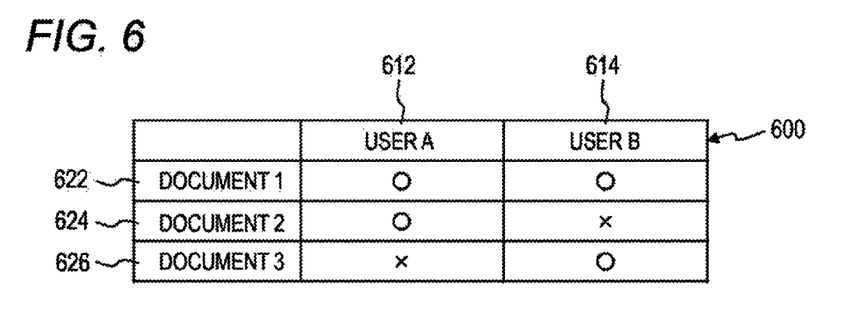
FIG. 6 is an explanatory diagram illustrating an example of the data structure of an access right table.

With regard to the development of a new product with company A
Share market analysis with company A In addition, an access right table 600 with regard to each document is extracted. That is, as shown in the access right table 600, it is assumed that an access right is given to two users (user A and user B). FIG. 6 is an explanatory diagram illustrating an example of the data structure of the access right table 600. The access right table 600 includes a user A section 612 and a user B section 614 in the row direction, and includes a document 1 section 622, a document 2 section 624, and a document 3 section 626 in the column direction. In an entry, which is determined by a user and a document, in the access right table 600, information which indicates that "there is an access right ("○" in the example in FIG. 6)" or "there is no access right ("x" in the example in FIG. 6)" is stored.

Figure 7:
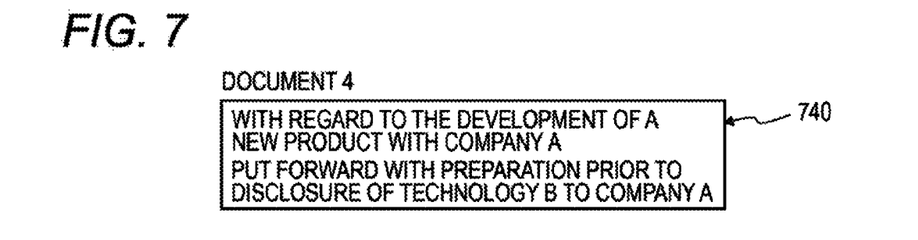
FIG. 7 is an explanatory diagram illustrating an example of a process according to the embodiment.
Figure 8A:
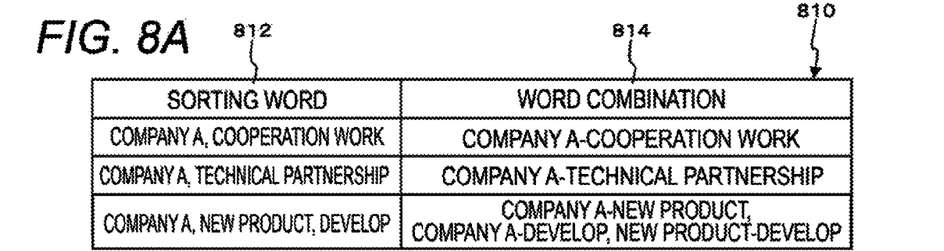
FIGS. 8A to 8D are explanatory diagrams illustrating examples of the data structure of a co-occurrence table.
Figure 8B:
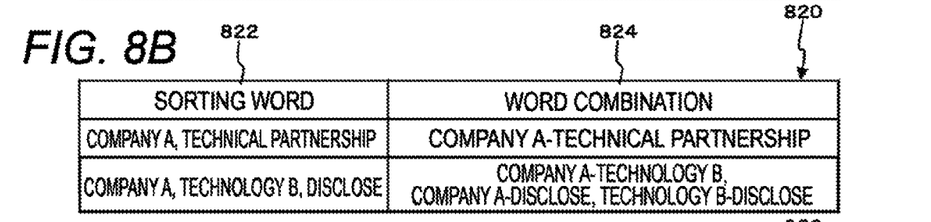
Figure 8C:
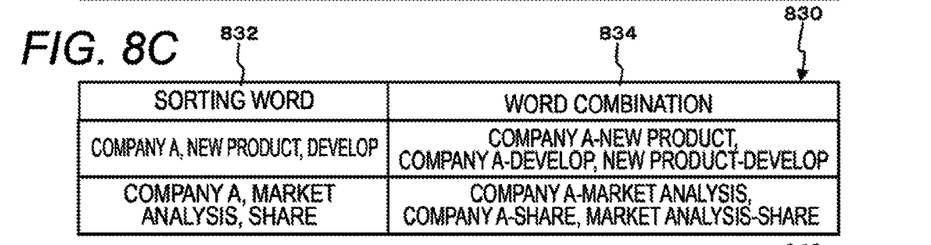

In step S402, the new document receiving module 150 receives a new document 4, and shows, for example, a case in which a user newly prepares the document 4 as illustrated in an example in FIG. 7 and determines a range of users to which an access right for the document 4 may be permitted. The document content 740 of the document 4 is as below.
With regard to the development of a new product with company A
Put forward with preparation prior to disclosure of technology B to company A In step S304, the component disassembling A module 130 generates a co-occurrence table 810 for the document 1, a co-occurrence table 820 for the document 2, and a co-occurrence table 830 for the document 3, as illustrated in the examples of FIGS. 8A to 8C. Further, in step S404, the component disassembling B module 160 generates a co-occurrence table 840 for the document 4, as illustrated in an example in FIG. 8D.

Here, an unimportant word is excluded from sorting. Further, it is possible to evaluate the importance level of a word through scoring based on the frequency of appearance of a word such as tf•idf.

And, some words are acquired through normalization of the morphological analysis.

FIG. 8A is an explanatory diagram illustrating an example of the data structure of the co-occurrence table 810 which indicates the result of a process performed on the document content 510.

The co-occurrence table 810 includes a sorting word section 812 and a word combination section 814. The sorting word section 812 stores words acquired from the document content 510 through sorting. The word combination section 814 stores combinations of the words. The row corresponds to a sentence.

More specifically, the co-occurrence table 810 shows that the component disassembling A module 130 generates a single combination "company A-cooperation work" based on two words "company A" and "cooperation work" of a first sentence in the sorting word section 812, generates a single combination "company A-technical partnership" based on two words "company A" and "technical partnership" of a second sentence, and generates three combinations "company A-new product", "company A-develop", and "new product-develop" based on three words "company A", "new product", and "develop" of a third sentence.

FIG. 88B is an explanatory diagram illustrating an example of the data structure of the co-occurrence table 820 which indicates the results of a process performed on the document content 520.

The co-occurrence table 820 includes a sorting word section 822 and a word combination section 824. The co-occurrence table 820 has a data structure which is equivalent to the co-occurrence table 810.

More specifically, the co-occurrence table 820 shows that the component disassembling A module 130 generates a single combination "company A-technical partnership" based on two words "company A" and "technical partnership" in a first sentence in the sorting word section 822, and generates three combinations "company A-technology 8", "company A-disclose", and "technology B-disclose" based on three words "company A", "technology B", and "disclose" in a second sentence.

FIG. 8C is an explanatory diagram illustrating an example of the data structure of the co-occurrence table 830 which indicates the results of a process performed on the document content 530.

The co-occurrence table 830 includes a sorting word section 832 and a word combination section 834. The co-occurrence table 830 has a data structure which is equivalent to the co-occurrence table 810.

More specifically, the co-occurrence table 830 shows that the component disassembling A module 130 generates three combinations "company A-new product", "company A-develop", and "new product-develop" based on three words "company A", "new product", and "develop" (which is normalized from "development") in a first sentence in the sorting word section 832, and generates three combinations "company A-market analysis", "company A-share", and "market analysis-share" based on three words "company A", "market analysis", and "share" in the second sentence.

Figure 8D:
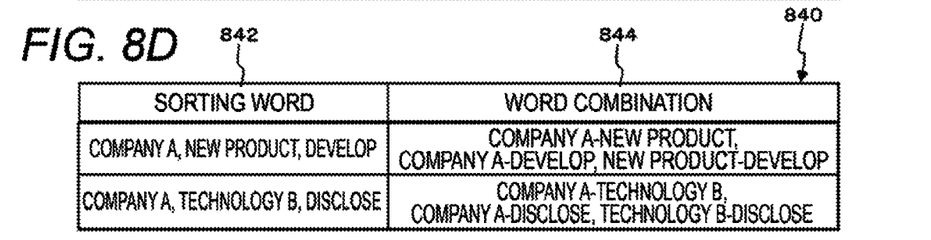

FIG. 8D is an explanatory diagram illustrating an example of the data structure of the co-occurrence table 840 which indicates the results of a process performed on the document content 740.

The co-occurrence table 840 includes a sorting word section 842 and a word combination section 844. The co-occurrence table 840 has a data structure which is equivalent to the co-occurrence table 810.

More specifically, the co-occurrence table 840 shows that the component disassembling B module 160 generates three combinations "company A-new product", "company A-develop", and "new product-develop" based on three words "company A", "new product", and "develop" (which is normalized from "development") of a first sentence in the sorting word section 842, and generates three combinations "company A-technology B", "company A-disclose", and "technology B-disclose" based on three words "company A", "technology B", and "disclose" (which is normalized from "disclosure") in the second sentence.

Figure 9:
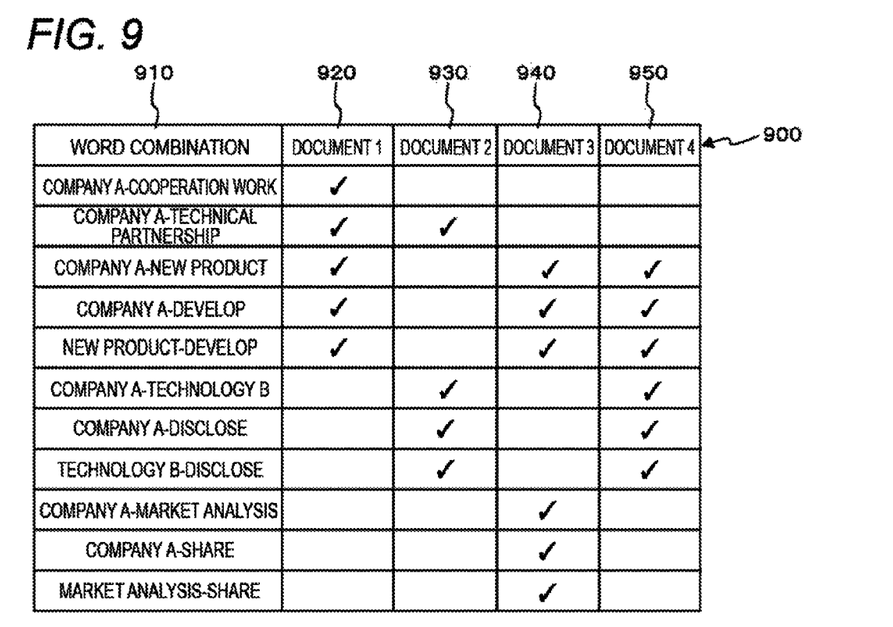
FIG. 9 is an explanatory diagram illustrating an example of the data structure of a word combination appearance table.

With regard to the document 1, the document 2, the document 3, and the document 4, it is possible to express a document in which each combination of two words appears as a word combination appearance table 900 which is illustrated in an example in FIG. 9. FIG. 9 is an explanatory diagram illustrating an example of the data structure of the word combination appearance table 900. The word combination appearance table 900 includes a word combination section 910, a document 1 section 920, a document 2 section 930, a document 3 section 940, and a document 4 section 950.

The word combination section 910 stores word combinations which are generated based on the word combination section 814, the word combination section 824, the word combination section 834 and the word combination section 844, and which are acquired by extracting the word combinations (only one combination is extracted from among repeated combinations) from the respective columns. The document 1 section 920 stores information which indicates whether or not the word combination is included in the document 1. The document 2 section 930 stores information which indicates whether or not the word combination is included in the document 2. The document 3 section 940 stores information which indicates whether or not the word combination is included in the document 3. The document 4 section 950 stores information which indicates whether or not the word combination is included in the document 4.

Here, an access right for each of the users of the existing document, the document 1, the document 2, and the document 3 are shown in the access right table 600 which is illustrated in the example in FIG. 6. Further, it is possible to consider that the access right indicates a person who may understand the content for which each combination of the two words stands. That is, the user A may understand the union of the combinations of words of the document 1 and the word combination of the document 2, and the user B may understand the union of the combinations of words of the document 1 and the combinations of words of the document 3.

Figure 10:
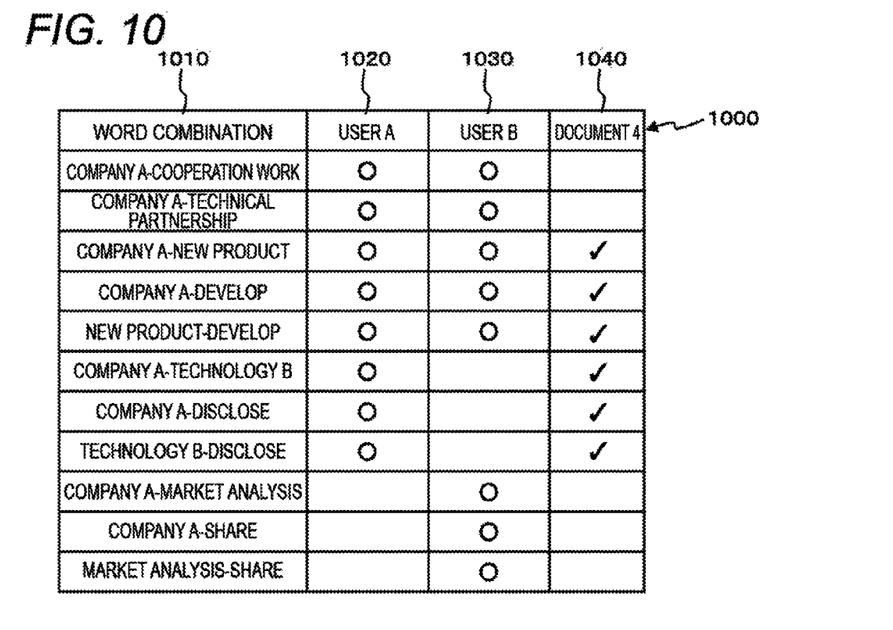
FIG. 10 is an explanatory diagram illustrating an example of the data structure of a word combination and access right user table.

When the word combination which may be known to each user is made into a table, the table is illustrated as in an example in FIG. 10. FIG. 10 is an explanatory diagram illustrating an example of the data structure of a word combination and access right user table 1000. The word combination and access right user table 1000 includes a word combination section 1010, a user A section 1020, a user B section 1030, and a document 4 section 1040.

The word combination section 1010 stores word combinations and is equivalent to the word combination section 910 of the word combination appearance table 900. The user A section 1020 stores information (information which indicates whether or not the word combination may be known to the user A) which indicates whether or not the user A has an access right to a document in which the word combination is included. The user B section 1030 stores information (information which indicates whether or not the word combination may be known to the user B) which indicates whether or not the user B has an access right to a document in which the word combination is included. The document 4 section 1040 stores information which indicates whether or not the word combination is included in the document 4.

Here, it is possible to consider that a user who does not have some access rights with regard to combinations of words included in the document 4 should be not able to access the content of the document 4.

Here, for example, a user who has at least one combination of words as described above is excluded, and remaining users (only the user A in the example) are set as users for whom it is estimated access may be permitted.

Further, in order to prevent an access right from not being permitted due to an unimportant combination of words, degrees for determining whether or not an access right may be given, may be estimated.

With regard to the degree, the estimated value of the degree, in which access may be permitted, is set by estimating the importance levels of the combinations of words are estimated based on, for example, the tf•idf values of the words, and acquiring a ratio of the sum of the importance levels of the respective combinations of words which appear in the subject document to the sum of the importance levels of the combinations of words in which the access rights thereof are included in the watching user.

When the importance levels of the combinations of words are as below:

company A-new product: 0.3
company A-develop: 0.2
new product-develop: 0.1
company A-technology B: 0.1
company A-disclose: 0.1
technology B-disclose: 0.4.

An estimated value of a degree, in which access to the document 4 may be permitted to the user A, is acquired as below:

$$(0.3+0.2+0.1+0.1+0.1+0.4)/(0.3+0.2+0.1+0.1+0.1+0.4)=1.0$$

An estimated value of a degree, in which the access to the document 4 may be permitted to the user B, is acquired as below:

$$(0.3+0.2+0.1)/(0.3+0.2+0.1+0.1+0.1+0.4)=0.5$$

Further, the training of the machine learning is performed by setting a document, to which access right is given, to a positive example and setting a document, to which access right is not given, to a negative example for each user while using the combinations of words as features, and an estimated value for the new document may be set to the estimated value of the degree in which the access right may be permitted.

The access right range notifying module 180 supports access right setting based on content by sending a notification about a user for whom it is estimated that access may be permitted or the estimated value of the degree in which the access right may be permitted, to the user. The estimated user and the estimated value are acquired in the above-described process.

Each page of the document may be used as the component of a document.

For example, in presentation materials or the like, which are documents, there are many cases in which editing (page copying or the like) is performed in a page as a unit, and thus each page may be used as a component. That is, instead of the above-described combinations of words, the page of a document may be used.

In this case, each document is analyzed in order to determine whether or not a page is included therein, and a table which is equivalent to the word combination appearance table 900 illustrated in the example in FIG. 9 is prepared. Here, when it is determined whether or not a certain page is included in a document, the determination may be performed based on the degree of similarity between images as images acquired when each page is printed out. An existing technology may be used for the determination of the degree of similarity between the images. For example, an exclusive OR (EOR) operation is performed between two images. When the number of remaining pixels is small, it may be determined that the degree of similarity is high. In addition, in that case, the determination may be performed by generating the images excepting a page number, header, footer, or the like.

Drawings in the document may be used as the component of the document.

There is a case in which image data (drawing), such as photo data in an album or a graph in an office document, is important in determining an access right to a file. Further, there are many cases in which editing (image data copying or the like) is performed in an image data unit, and thus the image data may be used as a component. That is, a drawing in a document may be used instead of the above-described combinations of words.

In this case, each document is analyzed to determine whether or not certain image data is included therein, and a table which is equivalent to the word combination appearance table 900 illustrated in the example in FIG. 9 is prepared. An existing technology may be used for determination of the similarity between image data.

Here, there is a case in which operations of enlarging, reducing, and compressing the image data are performed. Therefore, when determination whether or not to include certain image data in a document is performed, the determination may be performed by taking the operations into consideration. For example, the determination may be performed after generating original image data by performing a reverse process of the operation for the image data using operation history.

The words of text of a document may be used as the component of the document.

When words are used without using co-occurrence of the words, it is determined whether or not each document includes each word, and a table which is equivalent to the word combination appearance table 900 illustrated in the example in FIG. 9 is prepared.

Plural types of combinations of components may be used.

A process may be performed using both character information, such as words, and image data, such as graphs, as the components of a document.

In this case, an estimated value of a degree, in which an access right for the document may be permitted, may be acquired using a method of taking a weighted average for the estimated value of the degree, in which the access right may be permitted for each component, by using a preset ratio.

Further, training may be performed using each component as the feature of machine learning.

When a notification is sent that the specified user is included in an access right range according to the embodiment for a specified document, a notification of a component of a document which the specified user should not access may be provided. In this case, when the document is corrected such that the specified user is capable of accessing the document, a notification of content which should be corrected is provided. Here, correction includes, for example, unprintable words (for example, "XXX" or the like), conversion into the first letter (for example, "Mr. Smith" is converted into "Mr. S"), elimination of the component, or the like, and thus the correction may be performed on the document.

With regard to a certain existing document, acceleration of information sharing may be supported in the document management apparatus 250, which shares documents by searching for a document for which a narrower access right than necessary is set up and providing a notification that the narrower access right than necessary is set up to the user. That is, the new document, for which the access right is not given, is not set as a subject and a document to which the access right is previously given is set as a subject.

The document management apparatus 250 selects a document in the document storage module 110, and sends a notification of an access right range according to the embodiment. When the notified access right range is sufficiently wide compared to an access right range which is given to the document in advance, a notification that the access right range is sufficiently wide may be sent to the user.

With regard to a certain existing document, the fact that an access right is given to a user for whom the access right should not be given may be found, and thus prevention of the leakage of confidential information may be supported. That is, a new document, to which an access right is not given, is not set as a subject but a document to which the access right is previously given is set as a subject.

When a word combination access right user table 1000, which is illustrated in an example in FIG. 10, is prepared, realization is possible by entering the number of documents into an entry value of the word combination access right user table 1000. The word combination access right user table 1000 indicates the number of documents for which a certain user has an access right for a certain component. Here, with regard to a component, in which the number of documents (or a percentage of the number of documents in the number of total documents (the number of documents in a document group which is determined in advance)) 'is smaller than a threshold which is determined in advance, there is a high possibility that an access right is given falsely. It is designated that there is a possibility that incorrect access right setting is performed by sending a notification of a document which includes such a component.

In the embodiment, a notified access right range with regard to a document, including a component which has not appeared in the past, is 0 user, and therefore is not a preferable operation. The component which has not appeared in the past may be excluded from the "verify the access right of each component" (step S406 of the flowchart illustrated in the example in FIG. 4) in the flowchart. In addition, when the number of components (or a percentage of the number of total components in the document), which has not appeared in the past, is larger than the threshold which is determined in advance, an access right estimation which will not be given may be notified to the user.

Figure 11:
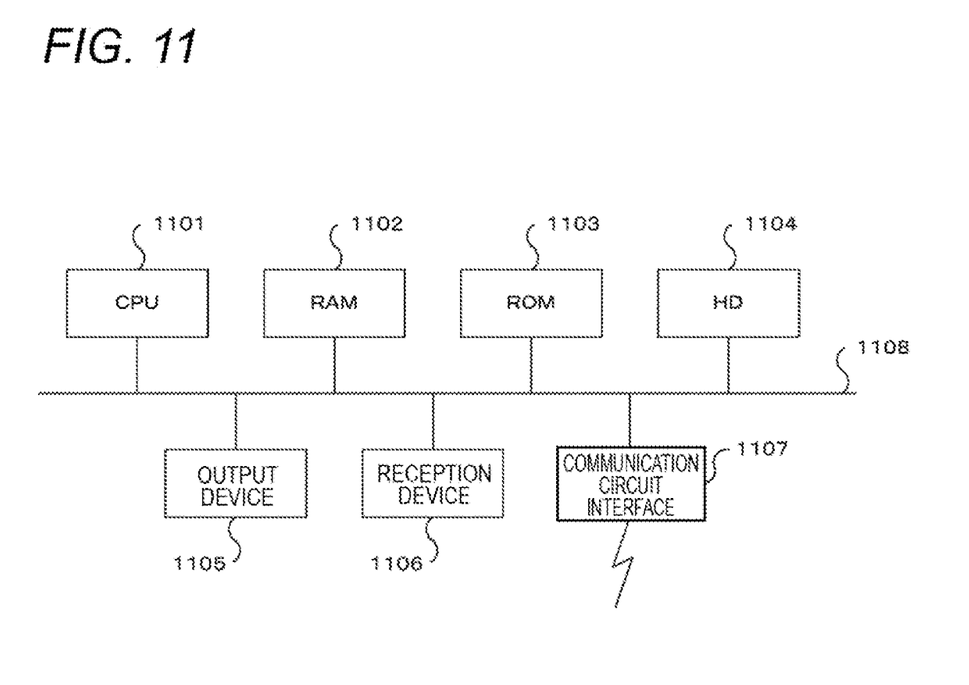
FIG. 11 is a block diagram illustrating an example of the configuration of the hardware of a computer which realizes the embodiment.

Meanwhile, the hardware configuration of a computer, in which a program according to the embodiment is executed, includes a general computer as illustrated in FIG. 11, and, more specifically, includes a computer which may function as a personal computer and a server. That is, as a specific example, a CPU 1101 is used as a processing unit (operating unit), and a RAM 1102, ROM 1103, and an HD 1104 are used as storage devices. For example, a hard disk Solid State Drive (SSD) may be used as the HD 1104. The computer includes the CUP 1101 that executes programs, such as the component disassembling A module 130, the component access right setting module 140, the new document receiving module 150, the component disassembling B module 160, the new document component access right verification module 170 and the access right range notifying module 180, the RAM 1102 that stores the programs or data, the ROM 1103 that stores a program or the like for driving the computer, the HD 1104 that is an auxiliary storage device (which may be a flash memory or the like) which functions as the document storage module 110 or the document access right storage module 120, a reception device 1106 that receives data based on an operation performed on a keyboard, a mouse, a touch panel, a microphone or the like by a user, an output device 1105, such as a CRT, a liquid crystal display or a speaker, a communication line interface 1107 that is connected to a communication network, such as a network interface card, and a bus 1108 which connects the devices to exchange data. Plural computers may be connected to each other through a network.

With regard to the hardware configuration, which is realized by a computer program, in the above-described embodiment, a system which has the hardware configuration is caused to read the computer program which is software, and software resources cooperate with hardware resources, thereby realizing the above-described embodiment.

Meanwhile, the hardware configuration illustrated in FIG. 11 shows an example of a single configuration. The embodiment is not limited to the configuration illustrated in FIG. 11, and a configuration, which enables a module described in the embodiment to be executed, may be used. For example, some modules may include dedicated hardware (for example, Application Specific Integrated Circuit (ASIC) or the like), and some modules may be included in an external system and may be connected by a communication line. Further, plural systems illustrated in FIG. 11 may be connected to each other through the communication line, and may cooperatively operate with each other. More specifically, in addition to a personal computer, the systems may be embedded into a mobile information communication device (which includes a mobile phone, a smart phone, a mobile device, a wearable computer, or the like), an information appliance, a robot, a copy machine, a facsimile, a scanner, a printer, a multifunction printer (an image processing apparatus which has two or more functions of a scanner, a printer, a copy machine, a facsimile, and the like), or the like.

Candidates to be provided for each of a reading right, a rewriting right, an elimination right, and the like as the access right may be extracted.

In addition, in the description of the above-described embodiment, when a value which is determined in advance is compared, "equal to or greater than", "equal to or less than", "greater than", and "less (under) than" may be "greater than", "less (under) than", "equal to or greater than", and "equal to or less than", respectively, unless contradiction occurs in the combination thereof.

Meanwhile, the described program may be stored in a recording medium, and the program may be provided by communication means. In this case, for example, the described program may be perceived as the invention of a "computer-readable recording medium which records a program".

The "computer-readable recording medium which records a program" indicates a computer-readable recording medium in which a program is recorded and which is used to install, execute, and distribute the program.

Meanwhile, the recording medium includes, for example, "a DVD-R, a DVD-RW, a DVD-RAM, or the like" which is a Digital Versatile Disk (DVD) and is a standard allocated in a DVD forum, "a DVD+R, a DVD+RW, or the like" which is a standard allocated in DVD+RW, a Compact disc (CD), such as a read only memory (CD-ROM), a CD recordable (CD-R) and a CD-Rewritable (CD-RW), a Blu-ray (registered trademark) Disc, a Magneto-Optical (MO) disk, a Flexible Disk (FD), a magnetic tape, a hard disk, a Read Only Memory (ROM), an Electrically Erasable Programmable Read-Only Memory (EEPROM (registered trademark)), a flash memory, a Random Access Memory (RAM), a Securing Digital (SD) memory card, and the like.

Further, the program or a part thereof may be recorded in the recording medium, and then be preserved or distributed. In addition, according to communication, the program may be transmitted using a transmission medium, such as wired network, a wireless communication network, or the combination thereof, which is used for, for example, a Local Area Network (LAN), a Metropolitan Area Network (MAN), a Wide Area Network (WAN), the Internet, the Intranet, an extranet, or the like. In addition, the program may be carried on a carrier wave.

Further, the program may be a part of another program or may be recorded in a recording medium together with an individual program. In addition, the program may be divided and recorded in plural recording media. In addition, the program may be recorded in any type of form if recovery, such as compression or encoding, is possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An access right estimation apparatus comprising:
a memory; and
at least one hardware processor configured to:
    extract at least one first component of a plurality of first components from a first object which forms a first document, a first access right being set up for the first document;
    associate the extracted first component with first access right information which indicates a user who has access to the first component based on the first access right which is set up for the first document;
    estimate a second access right that has yet to be set up for a second document, which includes at least one second component of a plurality of second components extracted from a second object that forms the second document, and estimate the second access right based on the at least one second component and the first access right information which is associated with the first component,
    estimate importance levels of the second components extracted from the second object that forms the second document,
    estimate the second access right to be set up for the second document using a first sum of the estimated importance levels of the second components, wherein each of the first components of the first document is a first combination of words, and each of the second components of the second document is a second combination of words,
    determine target-user access rights of a target user to the second components based on the first access right information,
    estimate whether the target-user access rights of the target user is to be set up for the second document by acquiring a ratio of a second sum of importance levels of the second components to which the target user has the target-user access rights to the first sum of the estimated importance levels of the second components, and
    notify the target user of the lack of the second access rights to the at least one second component of the second document when it is estimated that the target user lacks the target-user access rights to the second document.

2. The access right estimation apparatus according to claim 1, wherein the first and second objects include each page and a drawing of a document.

3. The access right estimation apparatus according to claim 1,
wherein the hardware processor extracts the first and second components from the first and second objects through morphological analysis.

4. The access right estimation apparatus according to claim 1,
wherein the hardware processor performs machine learning using the first components of the first document.

5. The access right estimation apparatus according to claim 1, wherein the hardware processor further estimates the first access right to be set up for the first document, and notifies a specified user of the first access right of the specified user having yet to be set up for the first document when it is estimated that the first access right of the specified user is to be newly set up for the first document.

6. The access right estimation apparatus according to claim 1, wherein the hardware processor further estimates the first access right to be set up for the first document, and sends a warning when it is estimated that the first access right of a specified user is yet to be set up for the first document.

7. The access right estimation apparatus according to claim 1, wherein the hardware processor, when one of the second components failing to coincide with any one of the first components, (1) excludes said one of the second components and estimates the second access right to the second document based on other second components or (2) terminates the estimation processing.

8. The access right estimation apparatus according to claim 7, wherein the hardware processor, when one of the second components fails to coincide with any one of the first components, notifies a user that a new access right is to be set up for the second document.

9. A non-transitory computer readable medium storing an access right estimation program causing a computer to function as: an access right estimation program causing a computer to instruct at least one hardware processor to:
    extract at least one first component of a plurality of first components from a first object which forms a first document, a first access right being set up for the first document;
    associate the extracted first component with first access right information which indicates a user who has access to the first component based on the first access right which is set up for the first document;
    estimate a second access right that has yet to be set up for a second document, which includes at least one second component of a plurality of second components extracted from a second object that forms the second document;
    estimate the second access right based on the at least one second component and the first access right information which is associated with the first component;
    estimate importance levels of the second components extracted from the second object that forms the second document;
    estimate the second access right to be set up for the second document using a first sum of the estimated importance levels of the second components, wherein each of the first components of the first document is a first combination of words, and each of the second components of the second document is a second combination of words;
    determine target-user access rights of a target user to the second components based on the first access right information;
    estimate whether the target-user access rights of the target user is to be set up for the second document by acquiring a ratio of a second sum of importance levels of the second components to which the target user has the target-user access rights to the first sum of the estimated importance levels of the second components; and notify the target user of the lack of the second access rights to the at least one second component of the second document when it is estimated that the target user lacks the target-user access rights to the second document.

\* \* \* \* \*